US 6,651,183 B1

(12) United States Patent
Gensler, Jr. et al.

(10) Patent No.: US 6,651,183 B1
(45) Date of Patent: Nov. 18, 2003

(54) TECHNIQUE FOR REFERENCING FAILURE INFORMATION REPRESENTATIVE OF MULTIPLE RELATED FAILURES IN A DISTRIBUTED COMPUTING ENVIRONMENT

(75) Inventors: Robert R. Gensler, Jr., Hyde Park, NY (US); Michael A. Schmidt, Stone Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/429,513

(22) Filed: Oct. 28, 1999

(51) Int. Cl.[7] .............................. G06F 11/00; H04L 1/22

(52) U.S. Cl. .......................................................... 714/4
(58) Field of Search ............................. 714/4, 2, 6, 13, 714/25, 27, 37, 39, 38, 47, 8, 57, 43, 48

(56) References Cited

U.S. PATENT DOCUMENTS

| 5,550,973 | A | | 8/1996 | Forman et al. ......... 395/182.03 |
|---|---|---|---|---|
| 5,664,093 | A | | 9/1997 | Barnett et al. .......... 395/183.07 |
| 5,684,807 | A | | 11/1997 | Bianchini, Jr. et al. .... 371/20.1 |
| 5,692,120 | A | | 11/1997 | Forman et al. ......... 395/182.08 |
| 5,704,031 | A | | 12/1997 | Mikami et al. ......... 395/182.02 |
| 5,740,354 | A | * | 4/1998 | Ben-Natan et al. .... 395/183.21 |
| 5,765,151 | A | | 6/1998 | Senator .......................... 707/8 |
| 5,826,008 | A | * | 10/1998 | Bluvband ................ 395/185.1 |
| 5,862,322 | A | | 1/1999 | Anglin et al. ............ 395/185.1 |
| 5,908,471 | A | | 6/1999 | Lach et al. ................... 714/805 |
| 5,949,759 | A | | 9/1999 | Cretegny et al. ........... 370/250 |
| 6,170,067 | B1 | * | 1/2001 | Lie et al. ....................... 714/48 |
| 6,175,931 | B1 | | 1/2001 | Hornung ........................ 714/4 |
| 6,243,827 | B1 | * | 6/2001 | Renner, Jr. ..................... 714/6 |
| 6,243,838 | B1 | * | 6/2001 | Liu et al. ....................... 714/57 |
| 6,385,737 | B1 | * | 5/2002 | Benignus et al. ............. 714/22 |
| 6,389,561 | B1 | * | 5/2002 | Bluvband ..................... 714/57 |

FOREIGN PATENT DOCUMENTS

| JP | 63-240233 | 10/1988 | ........... H04L/11/08 |
|---|---|---|---|
| JP | 04-257142 | 9/1992 | ........... H04L/12/42 |
| JP | 07-239835 | 9/1995 | ........... G06F/15/16 |
| JP | 10-260946 | 9/1998 | ........... G06F/15/16 |
| WO | WO 98/58316 | 12/1998 | ........... G06F/11/14 |

OTHER PUBLICATIONS

IEEE Transactions on Computers, vol. 41, No. 5, pp. 616–626, May 1992, "Implementation of online distributed system–level diagnosis theory", R.P. Bianchini Jr., et al.
IEEE Infocom '91, The Conference on Computer Communications, Proceedings, vol. 1, pp. 111–120, "Clustering schemes for network management", A. Bouloutas et al.

* cited by examiner

Primary Examiner—Nadeem Iqbal
(74) Attorney, Agent, or Firm—Laurence D. Cutter, Esq.; Kevin P. Radigan, Esq.; Heslin Rothenberg Farley & Mesiti P.C.

(57) ABSTRACT

In a distributed computing environment having a plurality of processing nodes, a technique is presented for referencing failure information representative of multiple related failures. A first failure report is created upon detection of an initial failure condition in a first program running in the distributed computing environment. The first program failure report is assigned a first identifier which uniquely identifies the report. Upon detecting a second program failure condition at a second node which is related to the first program failure condition, a second program failure report is created by recording information on the second program failure condition. A second identifier is assigned to the second program failure report which uniquely identifies the second program failure report, including a reference to the first identifier for the first program failure report. Thus, the first program failure report can be retrieved using the first identifier after retrieval of the second program failure report using the second identifier. Reports on a chain of related program failure conditions can therefore be created and subsequently referenced.

41 Claims, 13 Drawing Sheets

TECHNIQUE FOR REFERENCING FAILURE INFORMATION REPRESENTATIVE OF MULTIPLE RELATED FAILURES IN A DISTRIBUTED COMPUTING ENVIRONMENT

TECHNICAL FIELD

The present invention relates in general to distributed computing environments having a plurality of processing nodes, and more particularly, to a technique for referencing failure information representative of multiple related failure conditions occurring within the distributed computing environment at the same or different nodes of the plurality of nodes of the environment.

BACKGROUND OF THE INVENTION

A distributed system is often difficult to manage due to complicated and dynamic component interdependencies. Managers are used in a distributed system and are responsible for obtaining information about the activities and current state of components within the system, making decisions according to an overall management policy, and performing control actions to change the behavior of the components. Generally, managers perform five functions within a distributed system, namely configuration, performance, accounting, security, and fault management.

None of these five functions is particularly suited for diagnosing faults occurring in complex distributed systems. Diagnosing faults using manual management is time consuming and requires intimate knowledge of the distributed system. Also, it is difficult to isolate faults in a distributed environment because a resource limitation on one system may cause a performance degradation on another system, which is not apparent unless one is very familiar with the architecture of the distributed application and how the components work together.

In distributed computing environments, many software components are exploited in an interdependent fashion to provide function to the end-user. End-users are often not aware of the interdependencies of the various components; they only know that the environment provides some expected function. The components may be distributed amongst the various compute notes of the distributed computing environment. In cases where a component experiences a failure, this failure can ripple throughout the distributed computing environment, causing further failures on those components that rely upon the failed component for a specific function. This ripple effect continues, with components affecting the function of those components that rely upon them, until ultimately the end-user is denied the expected function.

The challenge in this environment is to trace the failure condition from its symptom (in this case, the denial of the expected function) to as close to the root cause of the problem (in this case, the original failed component) as possible in an acceptable period of time. Complicating this effort is the fact that multiple failure conditions may exist in the distributed computing environment at the same time. To properly identify the root cause, the failure conditions related to the failure symptom in question must be identified, and information pertaining to those failure conditions must be collected. Unrelated failure conditions should be eliminated from the analysis, since repair of these conditions would not lead to a repair of the failure symptom in question. Identifying these related failures has heretofore required an intimate knowledge of the distributed computing environment, its implementation, and the interdependencies of its components. Even with this level of knowledge, problem determination efforts are non-deterministic efforts, based on the "best guess" of the problem investigator as to where the root cause of the failure condition in question may reside. The larger and more complex the distributed computing environment, the more components introduced into the environment, the more difficult it becomes to reliably "guess" where the source of the failure may reside. The knowledge necessary to undertake the problem determination effort resides only with the distributed computing environment manufacturer, making it difficult for distributed computing environment administrators to effectively identify and resolve failures.

DISCLOSURE OF THE INVENTION

Briefly summarized, the present invention comprises in one aspect a method for referencing failure information in a distributed computing environment having a plurality of nodes. The method includes: creating a failure report by recording information on a failure condition upon detection of the failure condition at a node of the distributed computing environment; and assigning an identifier to the failure report and storing the failure report at the node, wherein the identifier uniquely identifies the failure report including the node within the distributed computing environment creating the failure report, and where within storage associated with the node the failure report is located.

In another aspect, the present invention comprises a method for referencing failure information in a distributed computing environment having a plurality of nodes. This method includes: creating a first program failure report upon detection of a first program failure condition at a first node; assigning a first identifier to the first program failure report which uniquely identifies the first program failure report including the node within the distributed computing environment creating the first program failure report and where within storage associated with that node the first program failure report is located; creating a second program failure report upon detecting a second program failure condition at a second node which is related to the first program failure condition, wherein the second program failure report is created by recording information on the second program failure condition at the second node, and wherein the second node and the first node may comprise the same node or different nodes within the distributed computing environment; and assigning a second identifier to the second program failure report which uniquely identifies the second program failure report including the second node within the distributed computing environment creating the second program failure report, where within storage associated with the second node the second program failure report is located, and the first identifier for the first program failure report on the first program failure condition related to the second program failure condition.

Systems and at least one program storage device readable by a machine, tangibly embodying at least one program of instructions executable by the machine to perform the above-summarized methods for referencing failure information in a distributed computing environment are also described and claimed herein.

To restate, presented is a technique for referencing failure information within a distributed computing environment. Persistent storage is employed which is accessible to all components of the environment. Reports of failures detected by system components, recorded to the persistent storage, preferably describe the nature of the failure condition, possible causes of the condition, and recommended actions to take in response to the condition. An identifier token is assigned which uniquely identifies a specific failure report for the failure condition, including location where the record resides within the distributed computing environment and the location within the persistent storage of that node where the record resides. Using this identifier, the failure report can be located from any location within the distributed computing environment and retrieved for use in problem determination and resolution analysis. This identifier is passed between related components of the environment as part of a component's response information. Should a component experience a failure due to another component's failure, the identifier is obtained from the first component's response information and included within the information recorded as part of the second component's failure report.

In accordance with the principles of the present invention, the previous need to guess where the distributed computing environment problem determination should begin to search for failure records is eliminated. The unique failure identifier provided to the end-user application will permit problem determination efforts to locate the failure reports regardless of where they reside within the distributed computing environment. The invention removes the need to identify failure reports related to the condition being investigated. The failure identifier references a failure report which in turn references one (or more) other failure report(s) associated with it. The related report will cite another related report, etc. The need to identify the failure reports which relate to the failure is thus removed, since each failure report explicitly cites the next related failure report.

In addition, an intimate understanding of the implementation and interdependencies of the distributed computing environment is no longer necessary to trace a failure condition. The present invention places the capability for performing problem determination and resolution back into the hands of the distributed computing environment administrator, instead of requiring the intervention of the distributed computing environment manufacturer. Guessing where the problem determination efforts should proceed from a specific point is no longer an issue, since the failure report will cite the next related problem, and hence where the investigation should next proceed. When no related link is reported, problem determination efforts begin at that point. It is no longer necessary to separate problem symptoms from root causes. The failure report for a problem symptom will specifically cite a report for its cause, or at the very least a next link in the list of related failures which will ultimately lead to the root cause. In accordance with the principles of the present invention, the problem symptom becomes a useful starting point for problem determination efforts, wherein in previous systems, it only clouded the effort. If the problem symptom is not also the root cause of the problem, it will contain a link to a chained list of problems and eventually lead problem determination efforts to the root cause.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Figure 1:
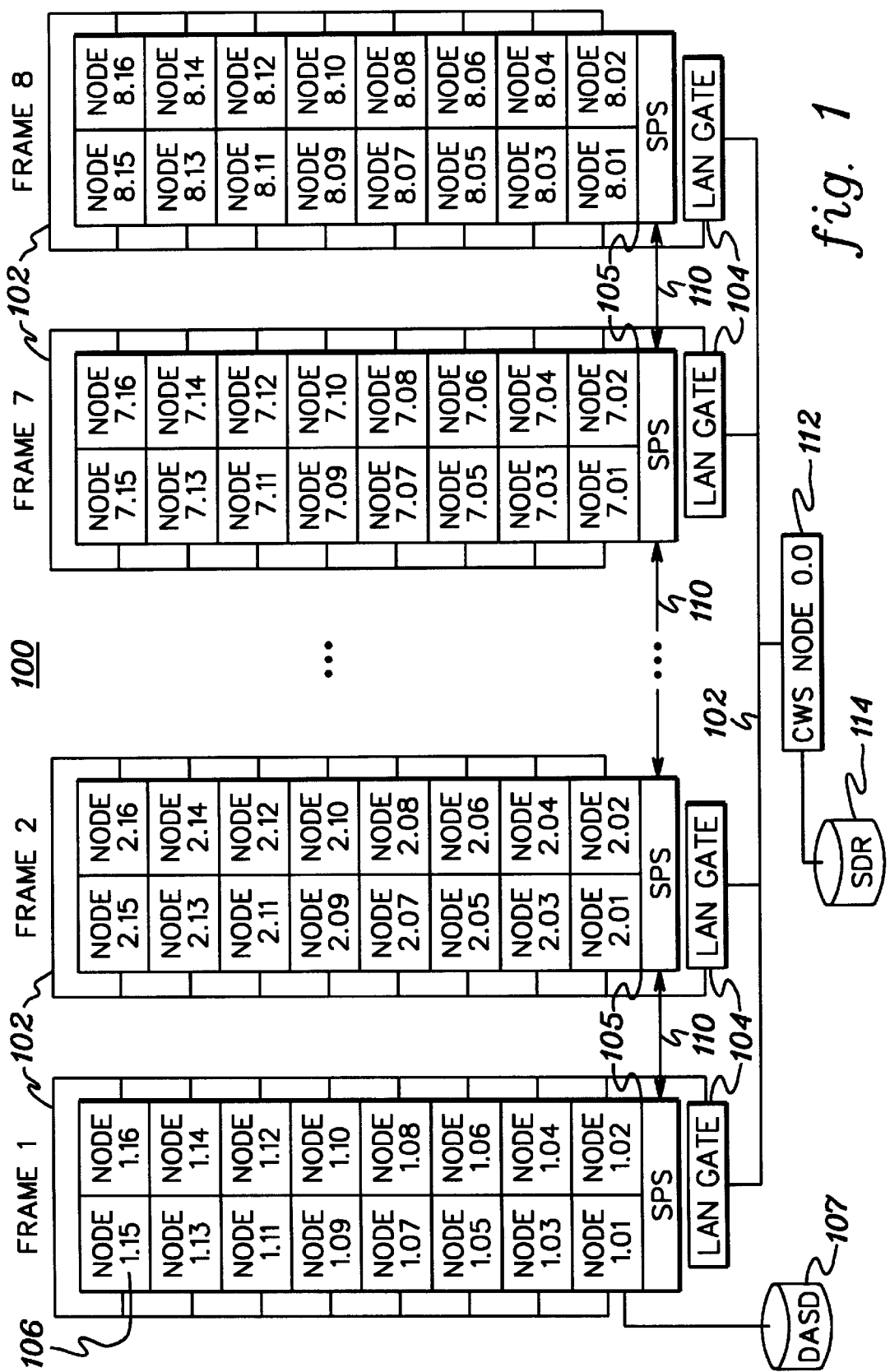
FIG. 1 depicts one embodiment of a distributed computing environment which is to employ failure information referencing capabilities in accordance with the principles of the present invention.

FIG. 1 is a schematic diagram of a distributed computer system 100 useable with the present invention. The distributed computer system 100 may be an IBM RISC System/6000 Scalable POWERparallel Systems (SP) distributed computer system available from International Business Machines Corporation of Armonk, N.Y. The embodiment disclosed in FIG. 1 is an SP computer having a total of 8 frames, with each frame having up to 16 nodes, for a total of 128 nodes. All of the nodes 106 are joined by a local area network (LAN) 102. Each node 106 is a computer itself, and may be a RISC System/6000 workstation, as is well-known by those skilled in the art.

All of the nodes in a frame of the SP computer 100 are included in a LAN segment which is joined by the other LAN segments through LAN gates 104. Also connected to the LAN 102, is a control workstation (CWS) 112 which controls operation of the SP computer 100. The control workstation has a direct access storage device (DASD) 114 referred to as the System Shared Disk on which is stored the system data repository (SDR) files. The SDR files include such information as a list of nodes that are in the system and their configuration, and includes resources and object definitions for each of the nodes 106. Each node 106 also includes a DASD device 107 for storing data processed by the SP computer 100.

In one embodiment, the nodes in each frame are also connected to an IBM Scalable POWERparallel switch (SPS) 105. Each of the SPS switches 105 of each frame is connected to neighboring SPS switches 105 of other frames by a bus 110.

As is well understood in the art, the CWS node 112 sends system data and control signals to the frames of the SP computer 100 by means of the LAN 102 while messages and data may be sent from one to another of the nodes 106 by means of the high performance switches 105.

Figure 2:
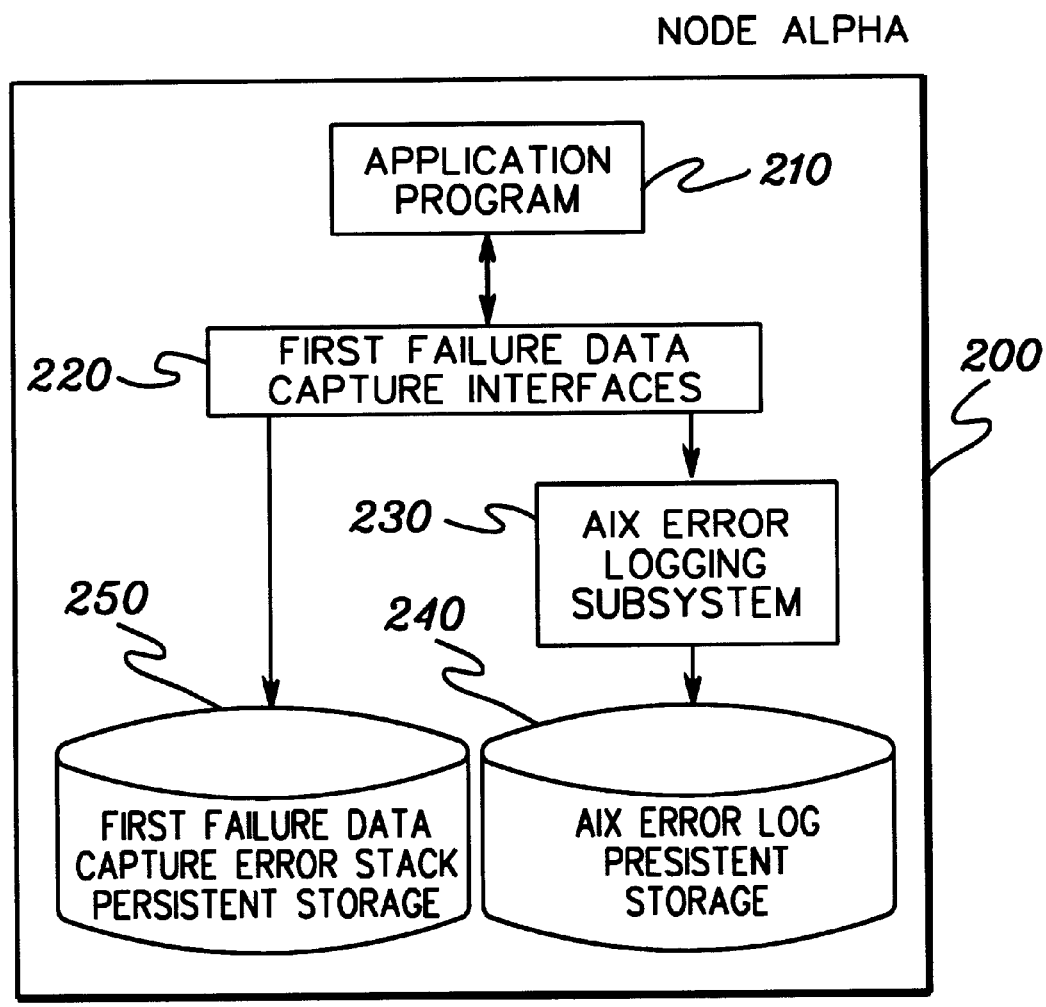
FIG. 2 is a block diagram of one node of a distributed computing environment which employs first failure data capture interface logic in accordance with the principles of the present invention.

More particular to the present invention, FIG. 2 depicts one embodiment of a node, node Alpha 200, of a distributed computing environment to employ failure information referencing in accordance with the principles of the present invention. Node Alpha 200 includes one or more application programs 210 which communicate with first failure data capture (FFDC) interfaces 220 implemented in accordance with the principles of the present invention. FFDC 220 stores and retrieves failure reports through, in one example, an AIX error logging subsystem 230 to an AIX error log persistent storage 240, or alternatively, to a first failure data capture error stack persistent storage 250. In an alternate embodiment, persistent storage 240 and persistent storage 250 may comprise the same storage within node Alpha 200. FFDC error stack 250 could store information that would not normally go into an AIX error log persistent storage 240. The AIX error logging subsystem 230 and AIX error log persistent storage 240 are components available with the AIX Operating System offered by International Business Machines Corporation.

In accordance with the present invention, hardware device drivers and software components that detect failures make persistent records of the failures using a software facility provided explicitly for this purpose, herein called the first failure data capture (FFDC). The FFDC creates a failure report if node Alpha 200 is the first node to detect a program failure, whether that program failure comprises an initial failure condition or an associated failure condition. As used herein, an "associated failure condition" is a failure which arises from the occurrence of another failure condition, either at the same node or a different node of the distributed computing environment.

Preferably, when making a failure record, the FFDC system component provides enough information so that: 1) the failure is adequately described so that later analysis efforts will understand the nature and scope of the failure condition; and 2) specific details that are of importance to the distributed computing environment manufacturer are recorded so that the manufacturer can understand how the condition came to exist, so any flaws in the distributed computing environment design can be identified and repaired.

The FFDC 220 computes a unique token for each specific failure report. This token, referred to herein as the identifier or FFDC failure identifier (FFDC ID), preferably encapsulates the following information:

Compute node location within the distributed computing environment where the failure is detected on the failure report is recorded.

Persist storage device used to store the failure report.

Specific location in the persistent storage device where the record resides.

Time at which the failure report is being recorded.

The FFDC failure identifier is generated by the FFDC software prior to recording the failure information to persistent storage. FFDC then incorporates the FFDC failure identifier as part of the failure information itself, and records the failure information and its FFDC failure identifier to persistent storage. The FFDC failure identifier is then provided back to the service component, e.g., a hardware device driver or software component, which provides this token to its client or user as part of the failure reporting information.

Figure 3:
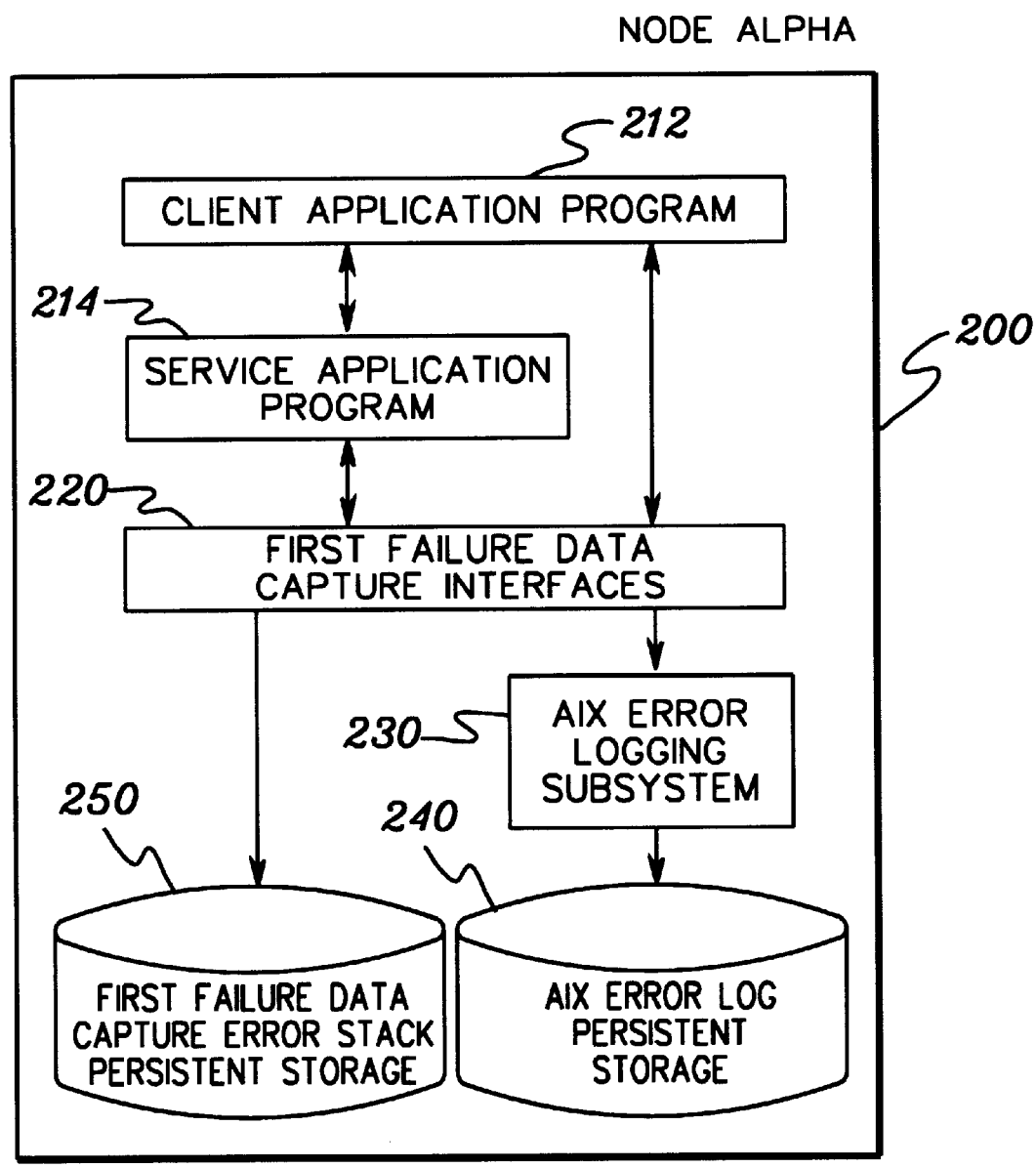
FIG. 3 is a block diagram of one node of a distributed computing environment which has both a server application program and a client application program, and which again employs first failure data capture interface logic in accordance with the principles of the present invention.

FIG. 3 depicts an alternate node Alpha, again denoted 200, which includes the FFDC interfaces 220, AIX error logging subsystem 230, AIX error log persistent storage 240 and first failure data capture error stack persistent storage 250 of FIG. 2. In addition, the application program in node Alpha 200 of FIG. 3 has been replaced with a server or service application program 214 and a client application program 212. Program 212 and program 214 can both interface directly with FFDC 220. In addition, the client application program 212 can interface indirectly therewith through the service application program. For example, the service might experience a failure and return its failure information that it receives from the FFDC 220 to the client program 212.

Figure 4:
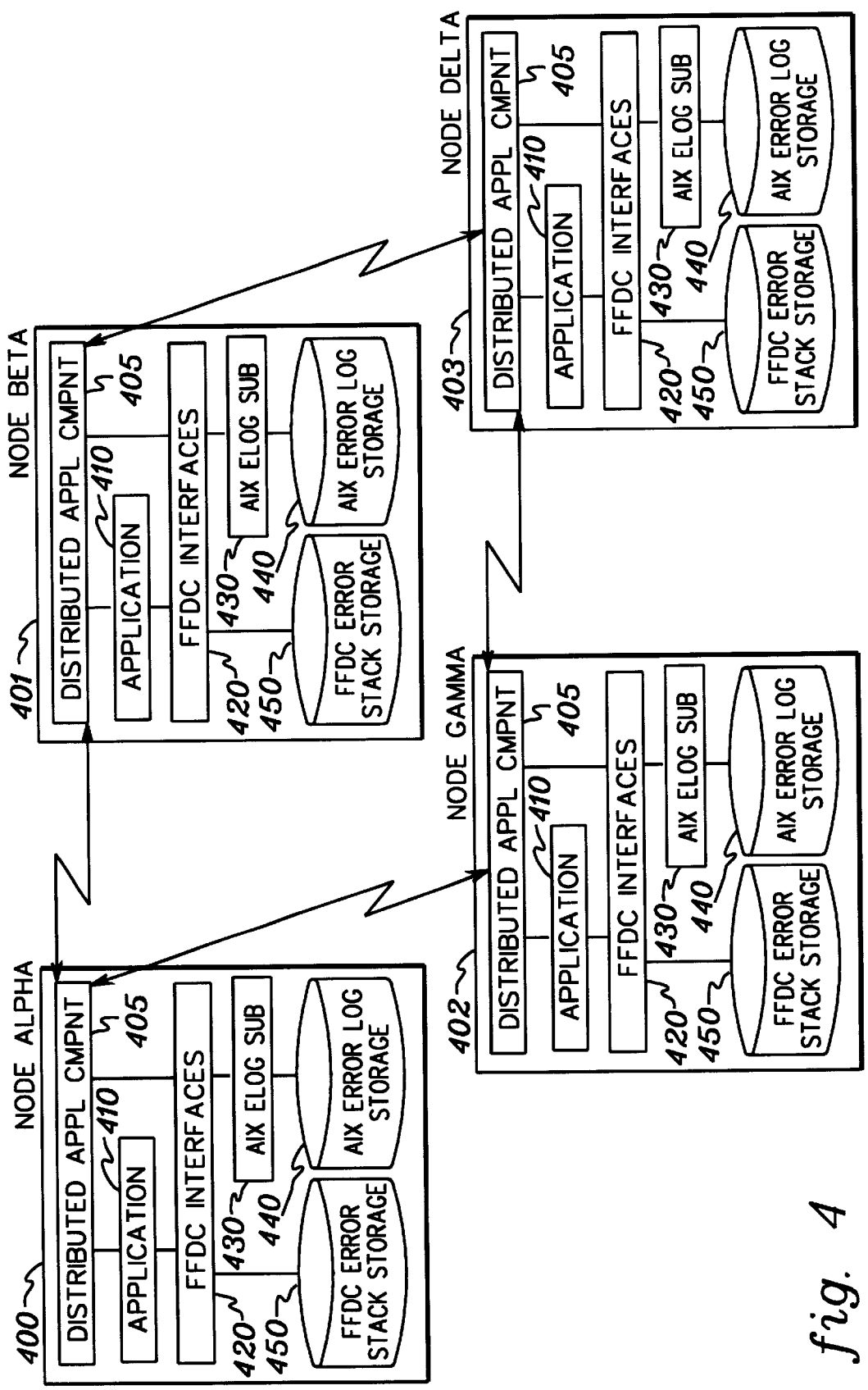
FIG. 4 is a diagram of a distributed computing environment having multiple processing nodes, with each processing node communicating to other processing nodes using a distributed application component, and with each processing node including first failure data capture (FFDC) interface logic in accordance with the principles of the present invention.

FIG. 4 depicts a distributed computing environment having a plurality of nodes, i.e., node Alpha 400, node Beta 401, node gamma 402 & node Delta 403. Each node 400, 401, 402 & 403 includes a distributed application component 405 which handles the distributed communication and data passing between the nodes. The FFDC interfaces 420 on each node do not communicate directly with each other. Each node further includes an application program 410, as well as AIX error logging (Elog) subsystem 430, AIX error log storage 440 and FFDC error stack storage 450. Each FFDC interface 420 is only concerned with recording information to persistent storage for its particular node. Again, the FFDC interfaces are responsible for recording the failure information in the form of failure reports and assigning the unique identifiers in accordance with the principles of the present invention. The unique identifiers can be transferred between nodes using the distributed application component. In one embodiment, the distributed application component 205 might comprise IBM's Parallel System Support Program (PSSP) software, version 3.1.

Figure 5:
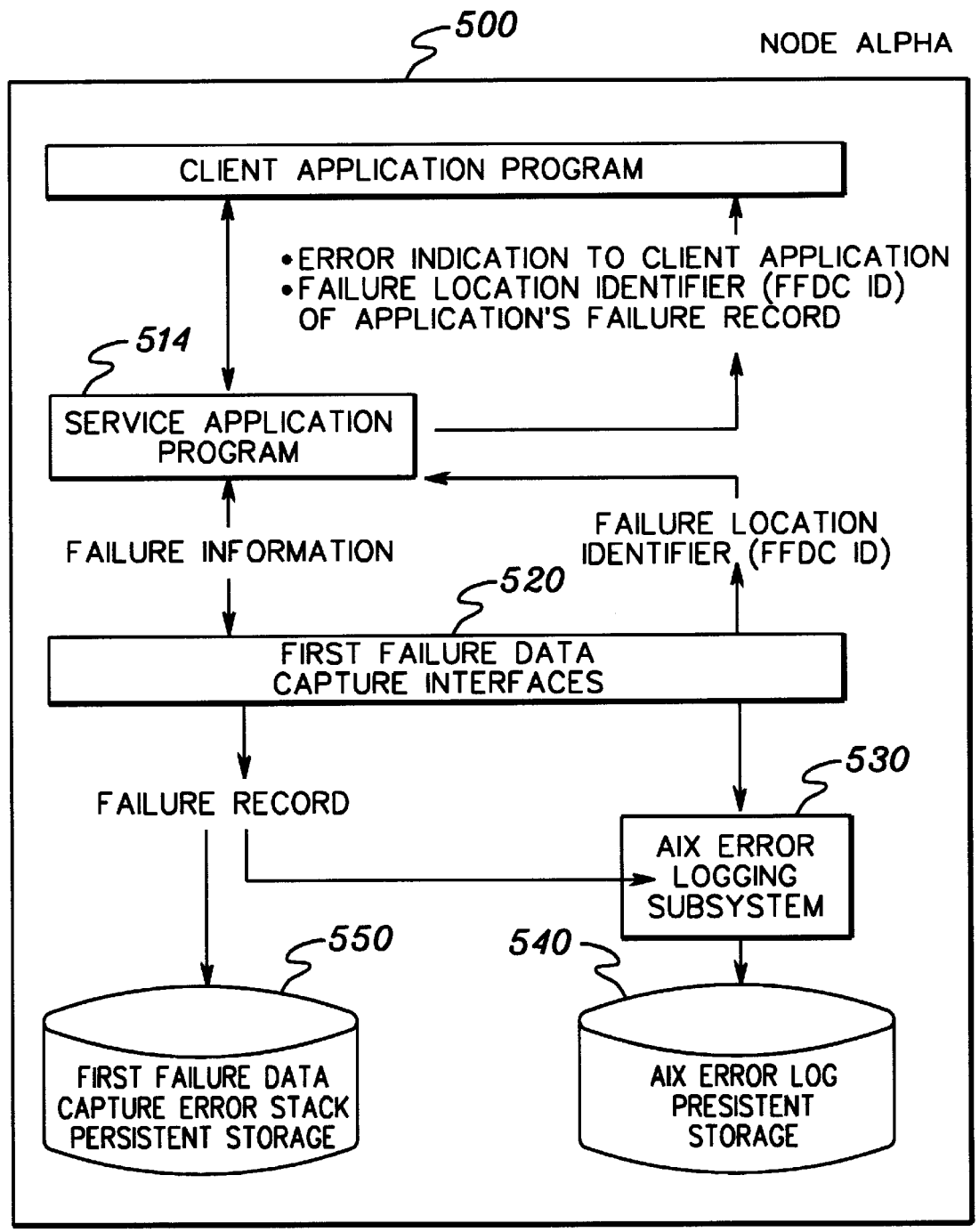
FIG. 5 is a block diagram of one node of a distributed computing environment which employs first failure data capture interface logic in accordance with the principles of the present invention, and wherein an initial error in the service application program is assumed.

FIG. 5 depicts one embodiment of a node Alpha 500 of a distributed computing environment which employs first failure data capture interface logic 520 in accordance with the principles of the present invention. In this example, an initial error or failure condition in a service application program 514 is assumed to have happened. Again, an "initial failure condition" comprises a first or root failure in a chain of failures, wherein each failure related to the initial failure condition and occurring subsequent thereto is referred to as an "associated failure condition". The FFDC interfaces 520 creates a failure record from failure information retained from service application program 514. This failure record is then recorded to persistent storage, i.e., in this embodiment, either through the AIX error logging subsystem 530 to AIX error log persistent storage 540 or directly to first failure data capture error stack persistent storage 550; for example, depending upon whether the information is to be made available to a system operator. The failure location identifier (FFDC ID) is provided by FFDC interfaces 520 to service application program 514, which may provide the identifier back to a client application program 512, in this case also residing on node Alpha 500. In addition to providing the FFDC ID, or application failure record, the service application program also provides the client application program with an indication of an error occurring in the service application program.

Figure 5A:
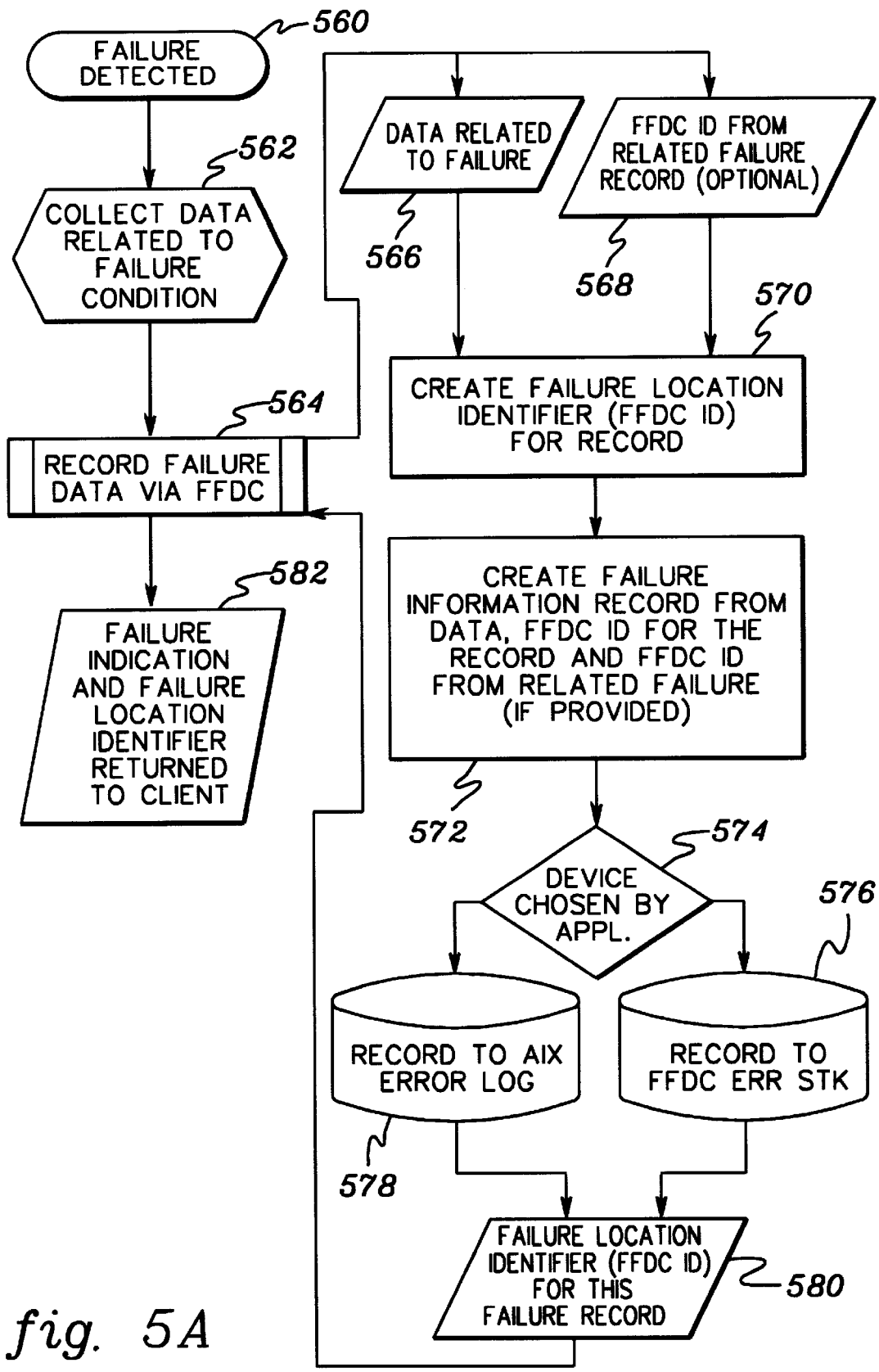
FIG. 5A is a flowchart of one embodiment for recording the initial program failure condition of FIG. 5 using the first failure data capture interface logic of the present invention.

FIG. 5A depicts one embodiment of logic for creating a failure record for storage to persistent storage at node Alpha of FIG. 5. A failure is initially detected 560 at the node at a layer above the FFDC interface. Data is collected related to the failure condition 562 and recorded via the FFDC interface 564.

This recording of data via the FFDC interface includes collecting the failure data related to the failure condition 566, and if the failure is an associated failure condition, the FFDC ID from the related failure record 568. The failure location identifier for the new record is created 570, as well as the failure record itself from the failure data, FFDC ID for the new record and FFDC ID from the related failure, i.e., if provided 572. The FFDC interface then chooses where the data is to be stored in persistent storage 574, i.e., records the data (in this example) either to the FFDC error stack 576 or to the AIX error log 578. The FFDC ID for the new failure report 580 is then returned by the FFDC interface 564 for forwarding with a failure indication to a client program 582.

Figure 6:
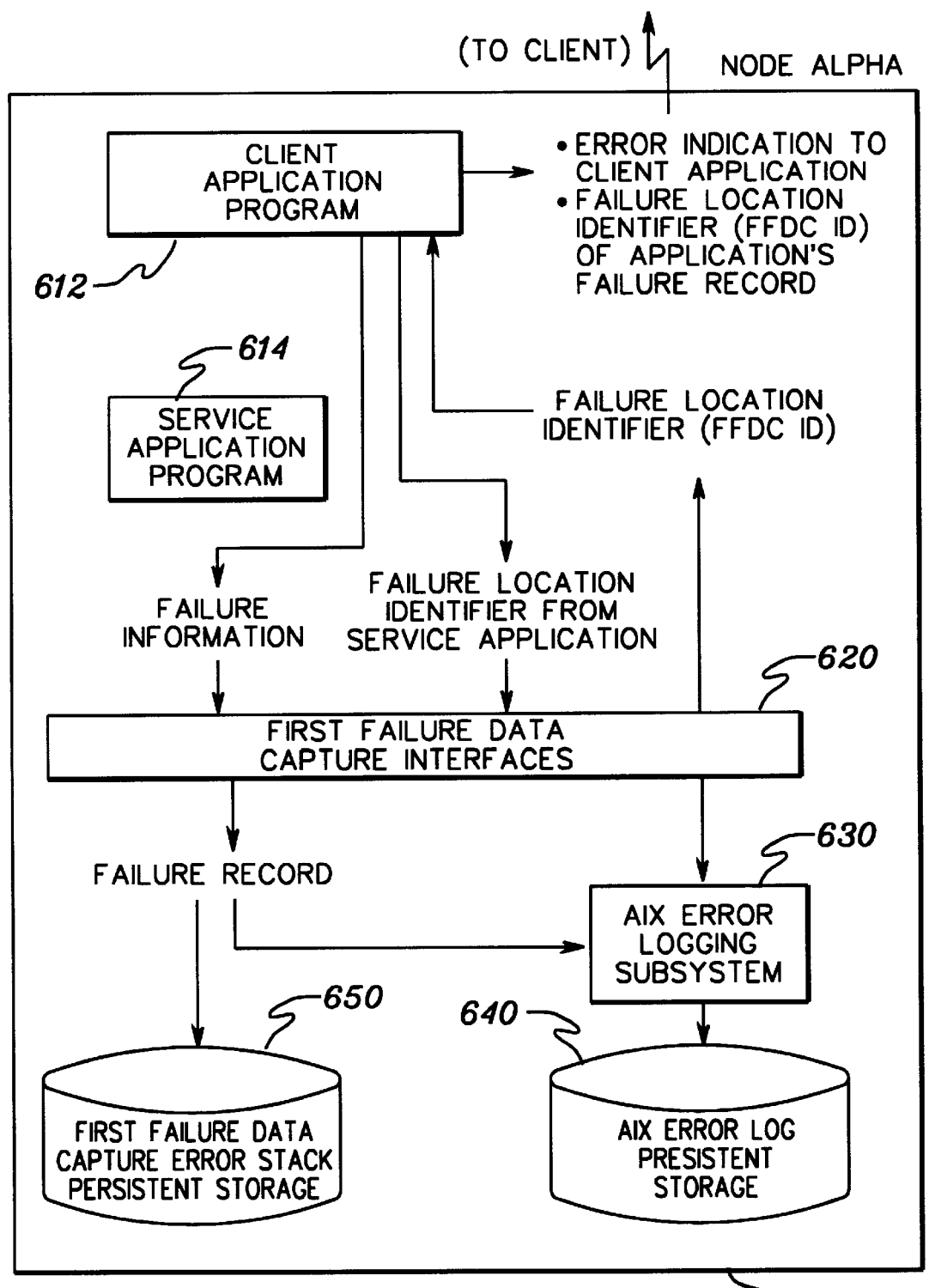
FIG. 6 depicts a node of a distributed computing environment which has the first failure data capture interface logic of the present invention, wherein an associated failure condition has occurred in a client application program.

FIG. 6 depicts a node 600 of a distributing computing environment wherein an associated failure condition is assumed to have occurred within client application program 612 responsive to a failure condition within service application program 614. Failure information from client application program 612 is forwarded to first failure data capture interfaces 620 for use in creating another failure record for storage to first failure data capture error stack persistent storage 650 or AIX error log persistent storage 640 through AIX error logging subsystem 630. The new failure location identifier FFDC ID is ultimately returned by the FFDC interfaces 620 to the client application program. Along with receiving the failure information for the associated failure condition, the FFDC interfaces receives the failure location identifier (FFDC ID) from the service application program 614 which identifies the location of the failure report on the initial failure condition occurring at program 614. The brand new FFDC ID is forwarded to the client application program, which may itself be a server program to a client residing (for example) at another node of the distributed computing environment. In such a case, an error indication is sent to the other node's client application, along with the failure location identifier (FFDC ID) for client application program's 612 failure record.

Figure 6A:
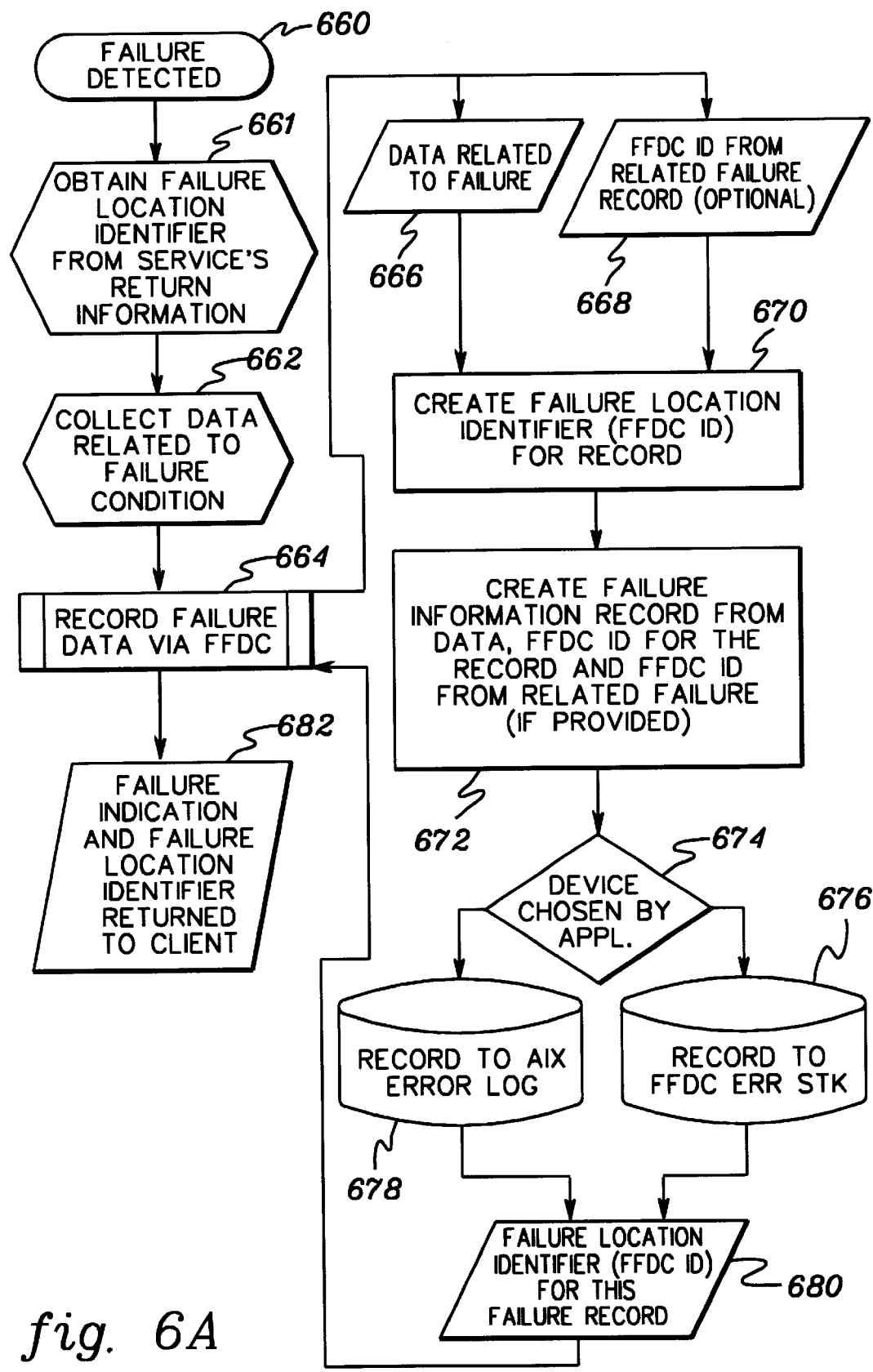
FIG. 6A is a flowchart of one embodiment for recording information on the associated failure condition of FIG. 6 using the first failure data capture interface logic.

FIG. 6A depicts an example of logic flow for recording the associated failure condition occurring in the node of FIG. 6 using the first failure data capture interface logic of the present invention. The associated failure condition is detected 660 and the server program's failure location identifier (FFDC ID) is obtained from the server program 661. Data is collected related to the associated failure condition 662 and a record failure is created using the FFDC logic 664.

The FFDC logic creates the data record using data related to the associated failure 666 as well as the FFDC ID from the related failure record 668. The new failure location identifier is assigned 670 and the new failure record is created from the failure data, the FFDC ID for the record and the FFDC ID from the prior related failure 672. A storage device is chosen 674, which may comprise the error stack 676 or the AIX error log 678. The new FFDC ID is then returned 680 through the interface logic 664 for forwarding to the client program off-node (in this example) with a failure indication 682.

Figure 7:
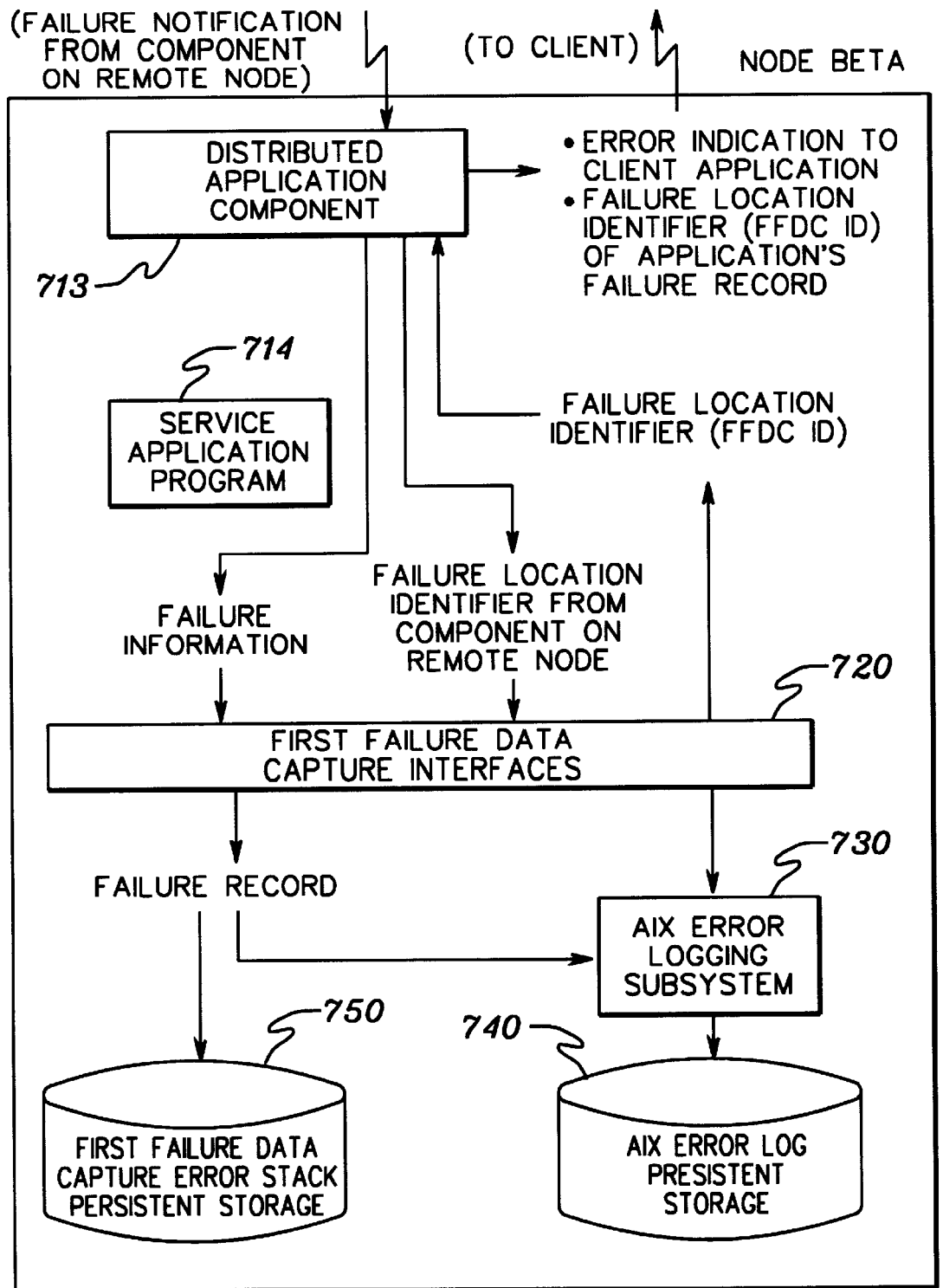
FIG. 7 depicts a node of a distributed computing environment which employs first failure data capture interface logic in accordance with the principles of the present invention to record an associated failure condition at the node responsive to failure notification from a component on a remote node of the distributed system.

FIG. 7 depicts an example of a failure notification being received from a remote node to a node Beta 700. In this example, a distributed application component 713 receives the failure notification and provides failure information to the first failure data capture interfaces 720. In addition to the failure information, a failure location identifier from the component on the remote node is received and the information is used to create a failure record for an associated failure condition occurring at node Beta 700. The failure record is again recorded to the AIX error log persistent storage 740 through an error logging subsystem 730 or to the first failure data capture error stack persistent storage 750; for example, depending upon whether an operator needs to presently know about the error to call for servicing or a replacement part. The FFDC interfaces 720 returns a new identifier for the new associated failure condition. This new FFDC identifier is forwarded along with an error indication to a client application running, e.g., in another node of the distributed application environment.

Figure 7A:
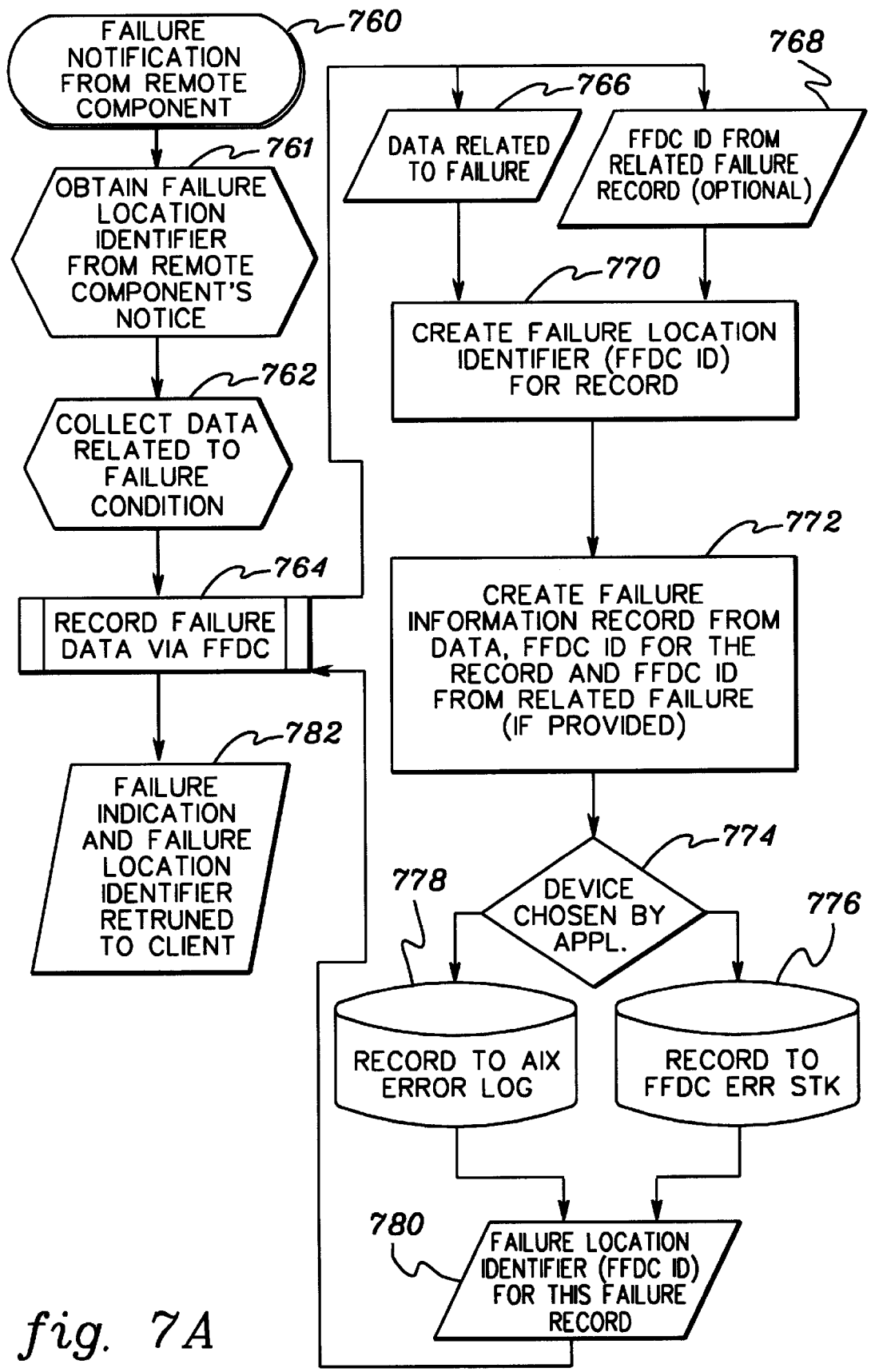
FIG. 7A is a flowchart of one embodiment for recording the associated failure condition of FIG. 7 using the first failure data capture interface logic of the present invention.

FIG. 7A is a flowchart of one embodiment for recording the associated failure condition depicted in FIG. 7. Failure notification is received from a remote component 760 including a failure location identifier 761. Data is collected related to the associated failure condition 762 occurring at node Beta 700 (FIG. 7). Together, this information is forwarded to the FFDC interfaces for recording of failure data in a failure report 764. The failure report is constructed by combining the data related to the failure at node Beta 766 with the FFDC ID received from the remote component 768 and assigning a new failure location identifier for the new failure record to be created at node Beta 770. The failure record is created from the associated failure condition data, FFDC ID for the new failure record, and the FFDC ID from the related failure received from the remote component 772. The FFDC interfaces then chooses a storage medium 774 which may comprise recordation of the failure record to the FFDC error stack 776 or AIX error log 778 as described above. Once recorded, the failure location identifier for the associated failure record stored at node Beta 780 is returned via the FFDC interfaces for forwarding to the client program along with a failure indication 782.

The invention described herein above is used to solve the aforementioned problem in diagnosing and resolving failures in a distributed computing environment. Recall that the difficulties in resolving these problems include:

A symptom seen by the end-user is rarely the root cause of the problem itself.

Symptoms are usually caused by failures that are caused by other failures in dependent components of the distributed computing environment.

Unless related failures can be automatically identified, an intimate understanding of the distributed computing environment's implementation and component interdependencies is required to know how to resolve these problems. This information is known only by the distributed computing environment manufacturer (taking problem resolution out of the hands of the customer).

Records of related failures must be identified, and unrelated failure records should not be included in the analysis.

Failure records are distributed throughout the distributed computing environment.

To summarize, through use of this invention, the distributed computing environment component that detects an initial failure condition records information about this failure to persistent storage. The component provides the failure information to the FFDC software, which calculates a unique token (the FFDC failure identifier) that identifies this failure report. The FFDC software then combines the FFDC failure identifier for this record and the failure information provided by the component into a failure report and records this report to persistent storage. The component provides this token to the dependent component as part of its failure information, much as it would provide a software error code to indicate a failure.

The dependent component may then experience a failure because the function it required from the failed component was necessary for it to deliver its own function. The dependent component records information about its own failure condition to persistent storage as well, and provides the FFDC Failure Identifier from the failed component as part of the failure information to be recorded. In doing so, the dependent component establishes a link between its own failure condition, and the original failure condition in the failed component that caused it. The dependent component submits this information to the FFDC software, which calculates a new FFDC identifier that will identify the dependent component's failure report. The FFDC software incorporates the new FFDC identifier, the dependent component's failure information, and the original failed component's related FFDC Failure Identifier into a single failure report, and records this report to persistent storage. The dependent component then receives the FFDC Identifier for its own record (not the original failed component's record) from the FFDC software. The dependent component provides this FFDC Identifier to its own client, much as it would provide a software error to indicate a failure.

The next component in the distributed computing environment would repeat the steps outlined in the previous paragraph, treating the dependent component as if it were the original failing component. The next component would provide the FFDC Failure Identifier and failure information to the FFDC software, which would calculate a new FFDC Failure Identifier for the new component's report, record all the information in a new failure record to persistent storage, and provide the FFDC Failure Identifier to the new component. The new component provides this new FFDC Failure Identifier to its client as part of its failure information, and the cycle repeats.

Using this method, the components of the distributed computing environment link together related failures. Whenever a failure occurs because of a failure in another component, a link is established to the related component's failure report.

In the aforementioned diagrams, the component executing on node Alpha detects a failure condition. As it records this failure condition to persistent storage, it obtains a unique token that identifies only that failure report. This token can be used from anywhere within the distributed computing environment to locate the exact failure report for this failure. The component on node Alpha provides this token (the FFDC Failure Identifier) to the component on the same node that requested a service of it. Because of this failure, the client application also experiences a failure. The client provides failure information plus the service's FFDC Failure Identifier to the FFDC software, which records the service's FFDC Identifier as part of the failure information. This establishes the link between the client's failure condition. A new FFDC Failure Identifier is created for the client's failure and provided back to the client by FFDC. The client then provides this new FFDC Failure Identifier to the component executing on node Beta, which requested service from its component executing on Alpha. The scenario is repeated, with the component on Beta recording the FFDC Failure Identifier from node Alpha in its failure report, thereby establishing a link between Beta's failure condition and the incident on node Alpha. A new FFDC Failure Identifier is created for Beta's failure report, and returned to the end-user application as part of Beta's failure response.

When the end-user application receives the FFDC Failure Identifier from node Beta, it has the initial link in a list of related failure conditions. This FFDC Failure Identifier is then used by other FFDC software utilities to retrieve the exact failure report for that identifier, obtain the identifier of the related failure, and then obtain that failure report as well. If the next failure report also contains a link to another associated failure report, that report is also obtained, and the cycle repeats until the failure for the root cause is obtained.

Figure 8:
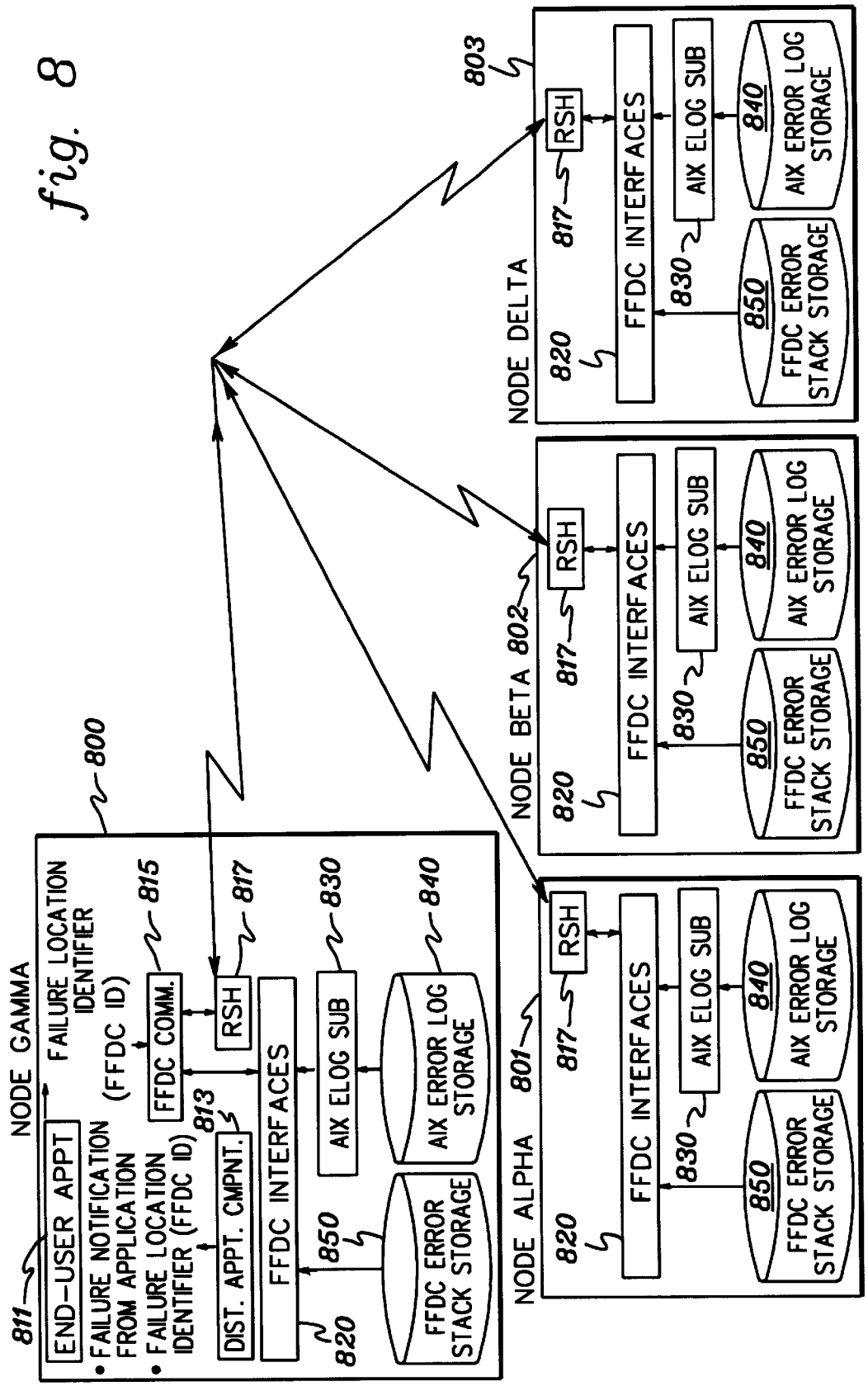
FIG. 8 depicts one embodiment of a distributed computing environment having multiple nodes, with each node employing the first failure data capture (FFDC) interface logic of the present invention, which can be used to trace a symptom of a failure to a root cause employing the techniques of the present invention.

FIG. 8 is an example of a distributed computing environment having multiple nodes 800, 801, 802 & 803 each of which implements the FFDC interfaces logic 820 of the present invention. Each node also includes the above-described AIX error logging subsystem 830, AIX error log storage 840 and FFDC error stack storage 850. The nodes communicate using FFDC commands 815 and an R shell at each node 817. R shell 817 is a remote shell command available in the UNIX operating system and provides job permission to execute commands on a remote node. Assuming that a distributed application receives a failure notification, the end-user 811 is advised of the failure and provided as described above with a failure location identifier (FFDC ID) by the distributed application component 813. This failure location identifier FFDC ID can then be forwarded to any requesting node through the FFDC commands 815 and R shell UNIX command 817. In this embodiment, end-user application 811 may retrieve a full list of failure conditions using the identifiers chained in accordance with the principles of this invention and retrieve the reports from the appropriate nodes 800, 801, 802 & 803 of the distributed computing environment.

Figure 8A:
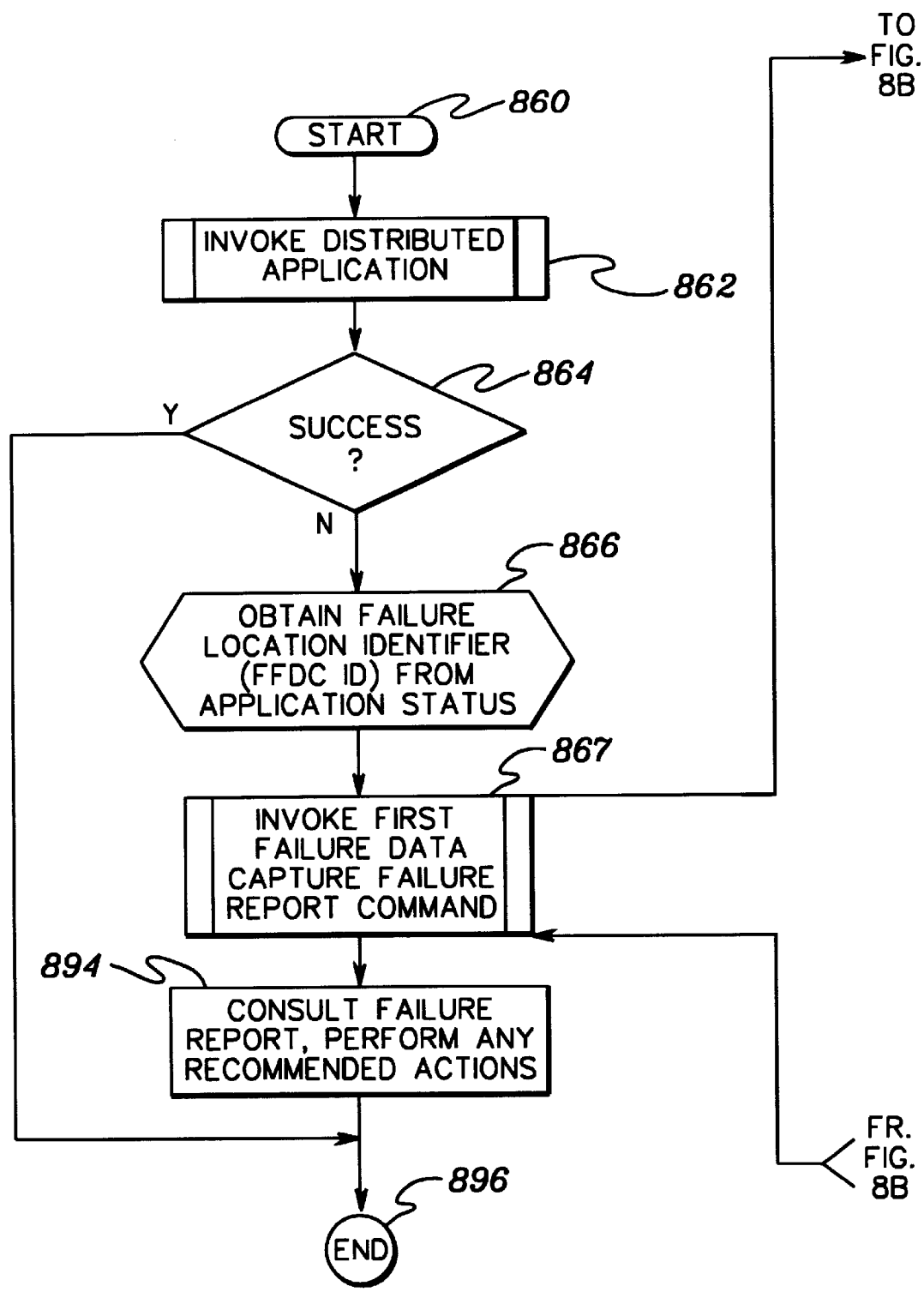
FIGS. 8A & 8B are a flowchart of one embodiment for tracing a symptom of a failure to a root cause using the first failure data capture interface logic and assigned identifiers of the present invention.
Figure 8B:
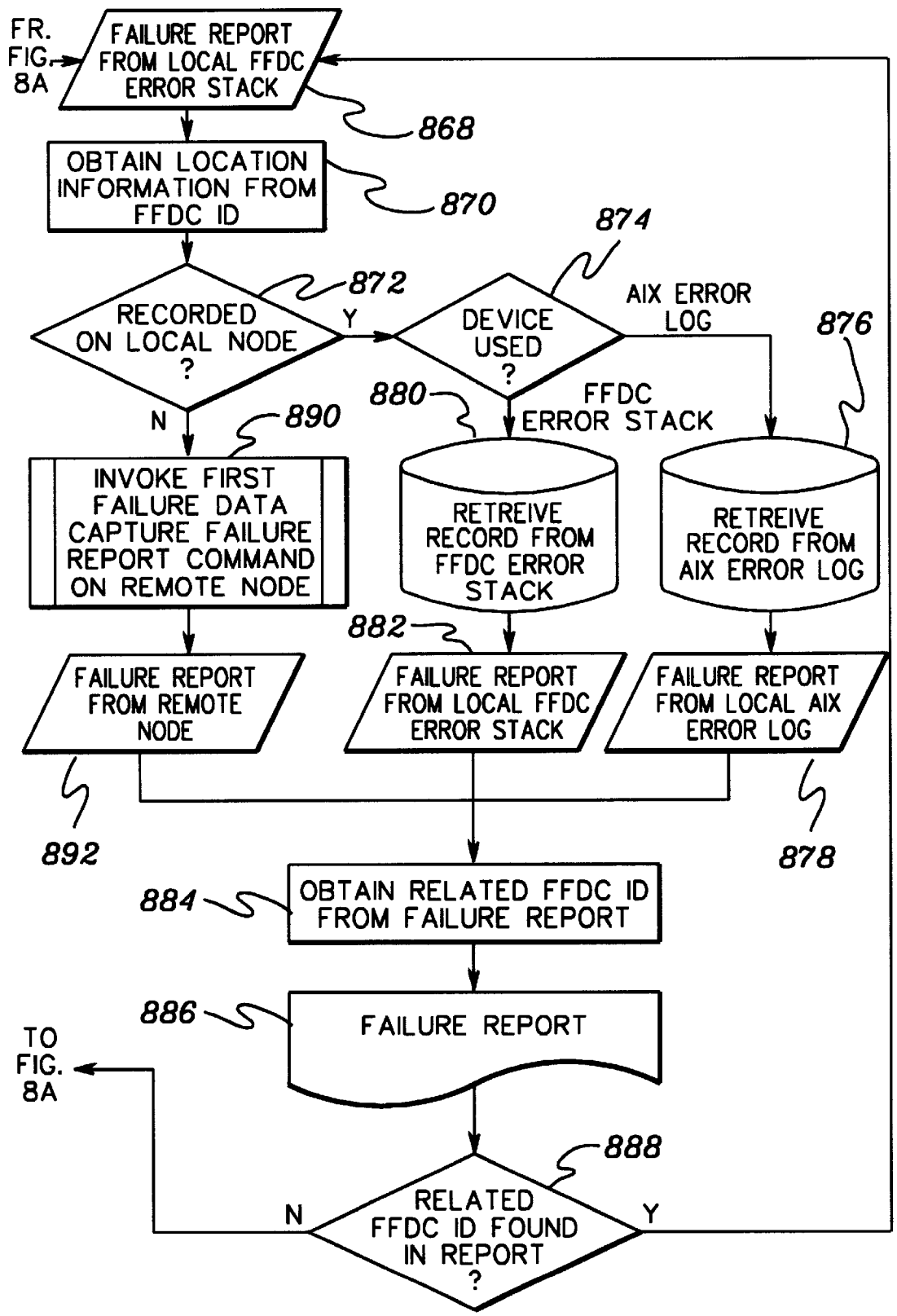

FIGS. 8A & 8B depict one embodiment for retrieving the failure reports. Tracing a symptom of a failure condition to a root cause may begin 860 by invoking a distributed application 862 and waiting to determine whether the application has completed successfully 864. If so, then processing is simply terminated 896. If a failure condition occurs, then the failure location identifier is obtained from the application status 866 and the first data capture failure report command is invoked 867 to collect failure report information from the nodes of the distributed system.

As shown in FIG. 8B, the failure report from the local FFDC error stack is first retrieved 868 and used to obtain location information on the next failure report 870. Inquiry is made whether the next failure report is recorded on the local node 872. If yes, then the FFDC interfaces determines whether the report was placed on the AIX error log or the FFDC error stack. The next report is retrieved from the appropriate persistent storage 876, 878 or 880, 882. Alternatively, if the next report is on a remote node, then the first failure data capture interfaces on the remote node is employed using a failure report command sent to the remote node 890. The failure report is returned from the remote node 892. The related FFDC ID is retrieved 884 from the failure report 892, 882, or 878, and the failure report is prepared for use in the report generated by the FFDC interfaces 886. The failure report is forwarded to the FFDC interfaces (FIG. 8B), but before forwarding the report, logic determines whether there is a related FFDC ID found in the report 888. If so, then processing loops back to obtain the failure report related to that FFDC ID 868. The failure reports are returned to the client program and consulted to perform any recommended action 894, after which trace processing terminates 896.

The above discussed failure information referencing capabilities of the present invention are summarized further below. Those skilled in the art will note that the persistent storage of failure records provided by the two software utilities depicted in the drawings are provided by way of example only. The AIX error log is provided as part of IBM's AIX Operating System, while the first failure data capture error stack is a new persistent storage table provided as part of the present invention.

Unique failure identifiers can be provided as a character string and calculated by the FFDC utilities from the following information:

The date and time a failure report is recorded.

An indication of the persistent storage device used to record the information (e.g., AIX Error Log and the FFDC Error Stack).

The error information template used to make this recording when the AIX Error Log device is used, or the i-node number for the FFDC Error Stack file when the FFDC Error Stack device is used.

The compute node's IP address, either IPv4 or IPv6 format.

This token is constructed entirely of displayable characters, making it possible to display this information to any terminal device or text file, as well as transmitting this data between system components.

Software components, applications, and hardware device drivers initialize an execution environment upon component startup. Information is stored in the process's environment to permit convenient and efficient retrieval by the FFDC utilities, and to avoid continual fetching of this information whenever a failure report needs to be generated. The computer node's IP address and the FFDC Error Stack used (if any) is included in this environmental data.

When a failure condition is detected, the software component, application, or hardware device driver provides the following information to the FFDC utilities:

An indication of the persistent storage device to be used for recording the failure report (e.g., the AIX Error Log or the FFDC Error Stack).

A description of the failure condition, through an error information template (in the case of the AIX Error Log) or a descriptive message (in the case of the FFDC Error Stack). When the AIX Error Log is chosen as the persistent storage device, the error information template is expected to specify at least four Detail Data fields, the first three of which are reserved for use by the FFDC utilities.

Details of the failure, intended for use by problem investigators.

An optional FFDC Failure Identifier, if a previously reported failure influenced the occurrence of this failure condition.

The FFDC utilities calculate a unique FFDC Failure Identifier for this failure report based on:

The environmental information set up by the component during its startup—the compute node's IP address, and FFDC Error Stack file i-node number (if the FFDC Error Stack is the persistent storage device used by this component).

The error information template identifier (if the AIX Error Log is the persistent storage device used by the component).

The current date and time.

When recording failure information to the AIX Error Log, the FFDC Failure Identifier for a previously reported failure provided by the component is included. This identifier is recorded, e.g., in the third Detail Data field.

When recording failure information to the FFDC Error Stack, the FFDC Failure Identifiers for the failure report and the optional related failure are recorded in the record fields reserved for that purpose.

The FFDC utilities record the failure report to the appropriate persistent storage device, and provide the FFDC Failure Identifier for the newly created record to the component reporting the failure. It is expected that the component will provide this FFDC Failure Identifier to its client as part of its failure reporting information, along with the failure indicator or message or return code that the component would normally provide to its client to signal a failure condition.

In cases where the component does not have the capability to send a variable amount of failure information to its client (for instance, a command that provides only an exit status to its parent shell or script), the component displays this FFDC Failure Identifier to the standard error device. The component's client obtains the FFDC Failure Identifier by parsing the standard error output from the component.

To find the root cause of a failure condition, the FFDC Failure Identifier of the symptom's failure report is provided to an FFDC end-user utility. This utility interprets the FFDC Failure Identifier to determine:

On what compute node in the distributed computing environment the failure report resides.

What persistent storage device on that compute node is used to record the failure report.

What error information template was used to record the failure information (in cases where the AIX Error Log is the persistent storage device).

What file is used to store the FFDC Error Stack information on that compute node (in cases where the FFDC Error Stack is the persistent storage device).

The date and time at which the record was made to the persistent storage device.

Once this information is obtained, the utility retrieves the failure report from the persistent storage device on the compute node indicated by the FFDC Failure Identifier. The FFDC Failure Identifier itself is used as a search key to identify the specific record for that failure condition—the FFDC Failure identifier is contained in the information recorded in the failure report. The AIX operating system command "errpt" is employed to obtain failure reports from the AIX Error Log, while the FFDC end-user command "fcstkrpt" is used to obtain failure reports from the FFDC Error Stack device. The AIX command "rsh" is used to obtain information from remote nodes in the distributed computing environment, in cases where the record of the failure does not reside on the system where the FFDC end-user is being executed.

The failure report obtained by the FFDC end-user utility is provided to the FFDC utility user, using the end-user's established locale. If this report contains an FFDC Failure Identifier for a related or associated failure, this FFDC Failure Identifier is obtained from the contents of the failure report. The previously listed steps are then repeated and failure reports obtained until one of the following conditions is met:

No further failure reports are referenced by a failure report—the report does not list an associated FFDC Failure Identifier in its failure report.

The failure report for an FFDC Failure Identifier cannot be obtained.

A list of failure reports is thus provided to the end-user(s). The user can understand the sequence of failures that led to the failure symptom noticed from the end-user's point of view. Problem determination efforts can begin using the last failure report obtained from the utility as a starting point, instead of starting from the end-user's failure symptom and attempting to "guess" where the failure may have originated.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for referencing failure information in a distributed computing environment having a plurality of non-dedicated nodes, said method comprising:

employing a distributed failure data capture system across the plurality of non-dedicated nodes, said distributed failure data capture system comprising persistent storage at the plurality of non-dedicated nodes for storing error reports in a distributed manner across the plurality of non-dedicated nodes, said employing including using the distributed failure data capture system to create a failure report by recording information on a failure condition upon detection of said failure condition at a node of the plurality of non-dedicated nodes detecting the failure; and assign an identifier to said failure report and store said failure report at said node in said persistent storage of the distributed failure data capture system, said identifier uniquely identifying the failure report including said node within the distributed computing environment creating and storing said failure report and where within storage associated with said node said failure report is located.

2. The method of claim 1, wherein said failure condition originates in a program running at said node, said program running at said node comprising a server program, and wherein said method further comprises providing said identifier to a client program running at any node of said plurality of nodes of the distributed computing environment for possible retrieval of said failure report from said any node, said any node comprising said node where said failure report is located or a different node of the distributed computing environment.

3. The method of claim 1, wherein said failure report is retrievable from any node of said plurality of nodes of said distributed computing environment using said identifier.

4. The method of claim 1, wherein said failure condition comprises an initial failure condition, and wherein said method further comprises creating a second failure report by recording information on an associated failure condition arising as a result of said initial failure condition, said associated failure condition occurring at any node of said plurality of nodes of said distributed computing environment, and assigning a second identifier to said second failure report and storing said second failure report at said any node, said second identifier uniquely identifying said second failure report including said any node within the distributed computing environment creating said second failure report, where within storage associated with said any node said second failure report is located, and said identifier for retrieval of said failure report for said initial failure condition.

5. The method of claim 4, wherein said initial failure condition occurs within a first program at said node and said associated failure condition occurs in a second program at said any node, wherein said first program comprises a server program and said second program comprises a client program.

6. The method of claim 4, wherein said associated failure condition comprises a first associated failure condition and wherein said method comprises repeating said creating and said assigning for n additional associated failure conditions, each additional associated failure condition having a unique identifier assigned thereto which identifies a node within said distributed computing environment where said additional associated failure condition arises, where within storage associated with said node its failure report is located, and an identifier for retrieval of a prior failure report for a failure condition in a chain of failure conditions comprising said n additional failure conditions related to said initial failure condition.

7. The method of claim 1, wherein said failure condition occurs within a server program, and wherein said method further comprises returning said identifier to a client program on said node or a different node of said plurality of nodes, along with a failure indication.

8. The method of claim 7, further comprising retrieving from said client program said failure report stored at said node of the distributed computing environment where said failure condition arose.

9. The method of claim 1, further comprising performing said creating and said assigning using a first failure data capture logic interface at said node, and storing said failure report in persistent storage associated with said node.

10. The method of claim 1, wherein said creating of said failure report includes recording at least one of a possible cause for said failure condition or a recommended action to take in response to said failure condition.

11. A distributed method for referencing failure information in a distributed computing environment having a plurality of non-dedicated nodes, said method comprising:

upon detection of a first program failure condition at a first node detecting the first program failure, creating a first program failure report by recording information on said first program failure condition and storing the first program failure report at the first node;

assigning a first identifier to said first program failure report which uniquely identifies the first program failure report including said node within the distributed computing environment creating said first program failure report and where within storage associated with said node said first program failure report is located;

upon detecting a second program failure condition at a second node which is related to said first program failure condition, creating a second program failure report by recording information on said second program failure condition, and storing the second program failure report at the second node, wherein said second node and said first node may comprise the same node or different nodes within said distributed computing environment; and assigning a second identifier to said second program failure report which uniquely identifies the second program failure report including said second node within the distributed computing environment creating said second program failure report, where within storage associated with said second node said second program failure report is located, and said first program identifier for said first program failure report on said first program failure condition related to said second program failure condition.

12. The method of claim 1, further comprising tracing failure information in said distributed computing environment, said tracing including retrieving said second program failure report from said second node using said second identifier, ascertaining therefrom said first identifier, and using said first identifier to retrieve said first program failure report at said first node of said distributed computing environment.

13. The method of claim 11, further comprising detecting n additional program failure conditions at one or more nodes of said distributed computing environment and creating n additional failure reports by recording information on each said program failure condition, each said program failure condition being related back to said first program failure condition, and assigning n unique identifiers to said n additional program failure reports, each unique identifier uniquely identifying a program failure report including the node within the distributed computing environment creating said program failure report, where within storage associated with said node said program failure report is located, and each program failure report, except for said first program failure report, including a reference to at least one other program failure report using one of said n unique identifiers, said first identifier or said second identifier.

14. A system for referencing failure information in a distributed computing environment having a plurality of non-dedicated nodes, said system comprising:

a distributed failure data capture system disposed across the plurality of non-dedicated nodes, said distributed failure data capture system comprising persistent storage at the plurality of non-dedicated nodes for storing error reports in a distributed manner across the plurality of non-dedicated nodes, said distributed failure data capture system comprising:

means for creating a failure report by recording information on a failure condition upon detection of said failure condition at a node of the plurality of non-dedicated nodes detecting the failure; and means for assigning an identifier to said failure report and for storing said failure report at said node in persistent storage of the distributed failure data capture system, said identifier uniquely identifying the failure report including said node within the distributed computing environment creating said failure report and where within storage associated with said node said failure report is located within the distributed computing environment.

15. The system of claim 14, wherein said failure condition originates in a program running at said node, said program running at said node comprising a server program, and wherein said system further comprises means for providing said identifier to a client program running at any node of said plurality of nodes of the distributed computing environment for possible retrieval of said failure report from said any node, said any node comprising said node where said failure report is located or a different node of the distributed computing environment.

16. The system of claim 14, wherein said failure report is retrievable from any node of said plurality of nodes of said distributed computing environment using said identifier.

17. The system of claim 14, wherein said failure condition comprises an initial failure condition, and wherein said system further comprises means for creating a second failure report by recording information on an associated failure condition arising as a result of said initial failure condition, said associated failure condition occurring at any node of said plurality of nodes of said distributed computing environment, and means for assigning a second identifier to said second failure report and storing said second failure report at said any node, said second identifier uniquely identifying said second failure report including said any node within the distributed computing environment creating said second failure report, where within storage associated with said any node said second failure report is located, and said identifier for retrieval of said failure report for said initial failure condition.

18. The system of claim 17, wherein said initial failure condition occurs within a first program at said node and said associated failure condition occurs in a second program at said any node, wherein said first program comprises a server program and said second program comprises a client program.

19. The system of claim 17, wherein said associated failure condition comprises a first associated failure condition and wherein said system comprises means for repeating said means for creating and said means for assigning for n additional associated failure conditions, each additional associated failure condition having a unique identifier assigned thereto which identifies a node within said distributed computing environment where said additional associated failure condition arises, where within storage associated with said node its failure report is located, and an identifier for retrieval of a prior failure report for a failure condition in a chain of failure conditions comprising said n additional failure conditions related to said initial failure condition.

20. The system of claim 14, wherein said failure condition occurs within a server program, and wherein said system further comprises means for returning said identifier to a client program on said node or a different node of said plurality of nodes, along with a failure indication.

21. The system of claim 20, further comprising means for retrieving from said client program said failure report stored at said node of the distributed computing environment where said failure condition arose.

22. The system of claim 14, wherein said means for creating and said means for assigning are implemented within a first failure data capture logic interface at said node, and wherein said means for storing comprises means for storing said failure report in persistent storage associated with said node.

23. The system of claim 14, wherein said means for creating of said failure report includes means for recording at least one of a possible cause for said failure condition or a recommended action to take in response to said failure condition.

24. A system for referencing failure information in a distributed computing environment having a plurality of non-dedicated nodes, said system comprising:
 a distributed failure data capture system distributed across the plurality of non-dedicated nodes, said distributed failure data capture system comprising persistent storage at the plurality of non-dedicated nodes for storing error reports in a distributed manner across the plurality of non-dedicated nodes;
 at least one non-dedicated processing node of said plurality of nodes employing the distributed failure data capture system to create a failure report by recording information at the at least one node on a failure condition upon detection of the failure condition at the at least one node; and
 the distributed failure data capture system being further adapted to assign an identifier to the failure report and store the failure report at said at least one node in said persistent storage of the distributed failure data capture system, said identifier uniquely identifying the failure report including the at least one node within the distributed computing environment creating and storing said failure report and where within storage associated with said at least one node said failure report is located.

25. A system for referencing failure information in a distributed computing environment having a plurality of non-dedicated nodes, said system comprising:
 means for creating a first program failure report by recording information on a first program failure condition detected at a first node and for storing the first program failure report at the first node;
 means for assigning a first identifier to said first program failure report which uniquely identifies the first program failure report including said node within the distributed computing environment creating said first program failure report and where within storage associated with said node said first program failure report is located;
 means for creating a second program failure report upon detecting a second program failure condition at a second node which is related to the first program failure condition, said second program failure report being created by recording information on said second program failure condition, and for storing the second program failure report at the second node, wherein said second node and said first node may comprise the same node or different nodes within the distributed computing environment; and
 means for assigning a second identifier to said second program failure report which uniquely identifies the second program failure report including said second node within the distributed computing environment creating said second program failure report, where within storage associated with said second node said second program failure report is located, and said first identifier for said first program failure report of said first program failure condition related to said second program failure condition.

26. The system of claim 25, further comprising means for tracing failure information in said distributed computing environment, said means for tracing including means for retrieving said second program failure report from said second node using said second identifier, means for ascertaining therefrom said first identifier, and means for using said first identifier to retrieve said first program failure report at said first node of said distributed computing environment.

27. The system of claim 25, further comprising means for detecting n additional program failure conditions at one or more nodes of said distributed computing environment and means for creating n additional failure reports by recording information on each said program failure condition, each said program failure condition being related back to said first program failure condition, and means for assigning n unique identifiers to said n additional program failure reports, each unique identifier uniquely identifying a program failure report including the node within the distributed computing environment creating said program failure report, where within storage associated with said node said program failure report is located, and each program failure report, except for said first program failure report, including a reference to at least one other program failure report using one of said n unique identifiers, said first identifier or said second identifier.

28. A system for referencing failure information in a distributed computing environment having a plurality of non-dedicated nodes, said system comprising:
 a first node of said plurality of nodes being adapted to create a first program failure report by recording information on said first program failure condition using first failure data capture interface logic and being adapted to store the first program failure report at the first node;
 said first node further being adapted to assign a first identifier to said first program failure report which uniquely identifies the first program failure report including said first node within the distributed computing environment creating said first program failure report and where within storage associated with said node said first program failure report is located, said first identifier being assigned using said first failure data capture interface logic of said first node;
 a second node adapted to create a second program failure report by recording information on a second program failure condition occurring at said second node, wherein said second program failure condition is related to said first program failure condition, and said second node is adapted to store the second program failure report at the second node, and said second node and said first node may comprise the same node or different nodes within said distributed computing environment, and wherein said second node creates said second program failure report using a first failure data capture interface logic at said second node; and
 said second node being further adapted to assign a second identifier to said second program failure report using said first failure data capture interface logic of said second node, said second identifier uniquely identifying the second program failure report including said second node within the distributed computing environment creating said second program failure report, where within storage associated with said second node said second program failure report is located, and said first identifier for said first program failure report of said first program failure condition related to said second program failure condition.

29. At least one program storage device readable by a machine, tangibly embodying at least one program of instructions executable by the machine to perform a method for referencing failure information in a distributed computing environment having a plurality of non-dedicated nodes, said method comprising:

employing a distributed failure data capture system across the plurality of non-dedicated nodes, said distributed failure data capture system comprising persistent storage at the plurality of non-dedicated nodes for storing error reports in a distributed manner across the plurality of non-dedicated nodes, said employing including using the distributed failure data capture system to create a failure report by recording information on a failure condition upon detection of said failure condition at a node of the plurality of non-dedicated nodes detecting the failure; and assign an identifier to said failure report and store said failure report at said node in said persistent storage of the distributed failure data capture system, said identifier uniquely identifying the failure report including said node within the distributed computing environment creating and storing said failure report and where within storage associated with said node said failure report is located.

30. The at least one program device of claim 29, wherein said failure condition originates in a program running at said node, said program running at said node comprising a server program, and wherein said method further comprises providing said identifier to a client program running at any node of said plurality of nodes of the distributed computing environment for possible retrieval of said failure report from said any node, said any node comprising said node where said failure report is located or a different node of the distributed computing environment.

31. The at least one program device of claim 29, wherein said failure report is retrievable from any node of said plurality of nodes of said distributed computing environment using said identifier.

32. The at least one program device of claim 29, wherein said failure condition comprises an initial failure condition, and wherein said method further comprises creating a second failure report by recording information on an associated failure condition arising as a result of said initial failure condition, said associated failure condition occurring at any node of said plurality of nodes of said distributed computing environment, and assigning a second identifier to said second failure report and storing said second failure report at said any node, said second identifier uniquely identifying said second failure report including said any node within the distributed computing environment creating said second failure report, where within storage associated with said any node said second failure report is located, and said identifier for retrieval of said failure report for said initial failure condition.

33. The at least one program device of claim 32, wherein said initial failure condition occurs within a first program at said node and said associated failure condition occurs in a second program at said any node, wherein said first program comprises a server program and said second program comprises a client program.

34. The at least one program device of claim 32, wherein said associated failure condition comprises a first associated failure condition and wherein said method comprises repeating said creating and said assigning for n additional associated failure conditions, each additional associated failure condition having a unique identifier assigned thereto which identifies a node within said distributed computing environment where said additional associated failure condition arises, where within storage associated with said node its failure report is located, and an identifier for retrieval of a prior failure report for a failure condition in a chain of failure conditions comprising said n additional failure conditions related to said initial failure condition.

35. The at least one program device of claim 29, wherein said failure condition occurs within a server program, and wherein said method further comprises returning said identifier to a client program on said node or a different node of said plurality of nodes, along with a failure indication.

36. The at least one program device of claim 35, further comprising retrieving from said client program said failure report stored at said node of the distributed computing environment where said failure condition arose.

37. The at least one program device of claim 29, further comprising performing said creating and said assigning using a first failure data capture logic interface at said node, and storing said failure report in persistent storage associated with said node.

38. The at least one program device of claim 29, wherein said creating of said failure report includes recording at least one of a possible cause for said failure condition or a recommended action to take in response to said failure condition.

39. At least one program storage device readable by a machine, tangibly embodying at least one program of instructions executable by the machine to perform a method for referencing failure information in a distributed computing environment having a plurality of non-dedicated nodes, said method comprising:

upon detection of a first program failure condition at a first node detecting the first program failure, creating a first program failure report by recording information on said first program failure condition and storing the first program failure report at the first node;

assigning a first identifier to said first program failure report which uniquely identifies the first program failure report including said node within the distributed computing environment creating said first program failure report and where within storage associated with said node said first program failure report is located;

upon detecting a second program failure condition at a second node which is related to said first program failure condition, creating a second program failure report by recording information on said second program failure condition, and storing the second program failure report at the second node, wherein said second node and said first node may comprise the same node or different nodes within said distributed computing environment; and assigning a second identifier to said second program failure report which uniquely identifies the second program failure report including said second node within the distributed computing environment creating said second program failure report, where within storage associated with said second node said second program failure report is located, and said first program identifier for said first program failure report on said first program failure condition related to said second program failure condition.

40. The at least one program device of claim 39, wherein said method further comprises tracing failure information in said distributed computing environment, said tracing including retrieving said second program failure report from said second node using said second identifier, ascertaining therefrom said first identifier, and using said first identifier to retrieve said first program failure report at said first node of said distributed computing environment.

41. The at least one program device of claim 39, wherein said method further comprises detecting n additional program failure conditions at one or more nodes of said distributed computing environment and creating n additional failure reports by recording information on each said program failure condition, each said program failure condition being related back to said first program failure condition, and assigning n unique identifiers to said n additional program failure reports, each unique identifier uniquely identifying a program failure report including the node within the distributed computing environment creating said program failure report, where within storage associated with said node said program failure report is located, and each program failure report, except for said first program failure report, including a reference to at least one other program failure report using one of said n unique identifiers, said first identifier or said second identifier.

* * * * *